(12) United States Patent
Voge et al.

(10) Patent No.: US 8,957,132 B2
(45) Date of Patent: *Feb. 17, 2015

(54) METHOD FOR MANUFACTURING AN ELASTOMERIC COMPOSITION HAVING A SELF-SEALING PROPERTY

(75) Inventors: Bozena Voge, Coumon D'Auvergne (FR); Vincent Pelissier, Romagnat (FR); Jose Merino Lopez, Riom (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 248 days.

This patent is subject to a terminal disclaimer.

(21) Appl. No.: 13/576,154

(22) PCT Filed: Jan. 21, 2011

(86) PCT No.: PCT/EP2011/050857
§ 371 (c)(1),
(2), (4) Date: Oct. 18, 2012

(87) PCT Pub. No.: WO2011/092123
PCT Pub. Date: Aug. 4, 2011

(65) Prior Publication Data
US 2013/0203913 A1    Aug. 8, 2013

(30) Foreign Application Priority Data

Jan. 28, 2010 (FR) ................................. 10 50596

(51) Int. Cl.
| | | |
|---|---|---|
| C08J 3/20 | (2006.01) | |
| C08L 9/00 | (2006.01) | |
| B29C 73/16 | (2006.01) | |
| B29D 30/06 | (2006.01) | |
| B60C 19/12 | (2006.01) | |
| C08J 3/22 | (2006.01) | |
| C08L 7/00 | (2006.01) | |
| C08K 3/00 | (2006.01) | |
| C08K 5/01 | (2006.01) | |
| C08L 57/02 | (2006.01) | |

(52) U.S. Cl.
CPC ................ *C08L 9/00* (2013.01); *B29C 73/163* (2013.01); *B29D 30/0685* (2013.01); *B60C 19/12* (2013.01); *C08J 3/226* (2013.01); *C08L 7/00* (2013.01); *B29D 2030/0686* (2013.01); *C08J 2421/00* (2013.01); *C08K 3/0033* (2013.01); *C08K 5/01* (2013.01); *C08L 57/02* (2013.01); *C08L 2205/03* (2013.01)
USPC .......................... 523/166; 523/351; 524/525

(58) Field of Classification Search
CPC .. B29C 73/163; B29C 73/18; B29D 30/0685; B60C 19/12; C08L 7/00; C08L 9/00; C08J 3/226
USPC .................................. 523/166, 351; 524/525
See application file for complete search history.

(56) References Cited

U.S. PATENT DOCUMENTS

| | | | |
|---|---|---|---|
| 8,710,140 B2 * | 4/2014 | Pialot et al. | .................. 524/525 |
| 2003/0230376 A1 | 12/2003 | Smith et al. | |

FOREIGN PATENT DOCUMENTS

| | | |
|---|---|---|
| DE | 102007031274 | 1/2009 |
| FR | 2877348 | 5/2006 |
| WO | WO2009/059709 | 5/2009 |
| WO | WO2009/156050 | 12/2009 |

* cited by examiner

*Primary Examiner* — Edward Cain
(74) *Attorney, Agent, or Firm* — Cozen O'Connor

(57) ABSTRACT

Process for the manufacture of an elastomer composition having a self-sealing property which is based on at least (phr meaning parts by weight per 100 parts of solid elastomer): a blend of at least two solid elastomers, a polybutadiene or butadiene copolymer elastomer, referred to as "elastomer A", and a natural rubber or synthetic polyisoprene elastomer, referred to as "elastomer B", the elastomer A:elastomer B ratio by weight being within a range from 10:90 to 90:10; between 30 and 90 phr of a hydrocarbon resin; from 0 to less than 30 phr of filler, in which, during a first stage or stage (a), a masterbatch comprising at least the elastomers A and B and between 30 and 90 phr of a hydrocarbon resin is prepared by mixing these various components in a mixer at a "hot compounding" temperature or up to a "hot compounding" temperature which is greater than the softening temperature of the hydrocarbon resin.

45 Claims, 2 Drawing Sheets

Figure 1:
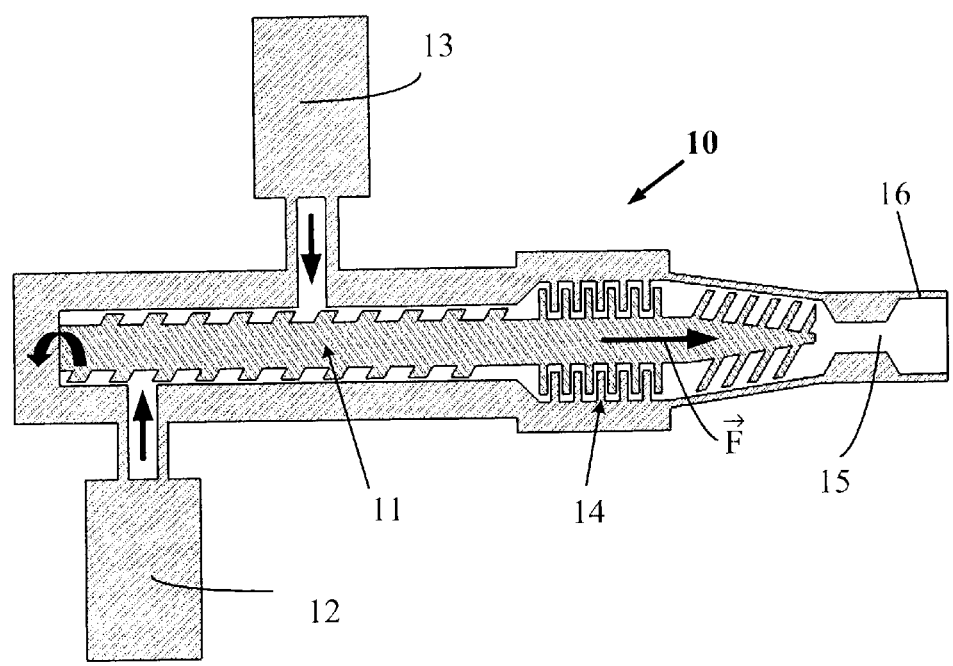

METHOD FOR MANUFACTURING AN ELASTOMERIC COMPOSITION HAVING A SELF-SEALING PROPERTY

RELATED APPLICATIONS

This is a U.S. national stage of application No. PCT/EP2011/050857, filed on Jan. 21, 2011. Priority is claimed on the following application: French Application No. 1050596, filed on Jan. 28, 2010, the content of which is hereby incorporated here by reference.

FIELD OF THE INVENTION

The present invention relates to self-sealing compositions which can be used as puncture-resistant layers in any type of "inflatable" article, that is to say, by definition, any article which takes its usable shape when it is inflated with air.

It relates more particularly to processes for the manufacture of self-sealing compositions based on a diene elastomer, such as natural rubber.

BACKGROUND OF THE INVENTION

For some years, tire manufacturers have been making particularly great efforts to develop novel solutions to a problem dating from the very beginning of the use of wheels fitted with tires of inflated type, namely how to allow the vehicle to continue its journey despite a significant or complete loss of pressure from one or more tires. For decades, the spare wheel was regarded as the sole and universal solution. Then, more recently, the considerable advantages related to its possible removal have become apparent. The concept of "extended mobility" was developed. The associated techniques make it possible to run with the same tire, according to certain limits to be observed, after a puncture or a fall in pressure. This makes it possible, for example, to drive to a breakdown point without having to halt, under often hazardous conditions, to fit the spare wheel.

Self-sealing compositions capable of making it possible to achieve such an objective, by definition capable of automatically ensuring, that is to say without any external intervention, the airtightness of a tire in the event of perforation of the latter by a foreign body, such as a nail, are particularly difficult to develop.

In order to be able to be used, a self-sealing layer has to satisfy numerous conditions of a physical and chemical nature. In particular, it has to be effective over a very wide range of operating temperatures, this being the case over the whole of the lifetime of the tires. It has to be capable of sealing the hole when the perforating article remains in place; when the latter is expelled, it has to be able to fill in the hole and to render the tire airtight.

Numerous solutions have admittedly been devised but they have not been able truly to be deployed to date in vehicle tires, in particular due to difficulties in manufacturing these self-sealing compositions and thus to their final cost price.

In particular, high-performance self-sealing compositions, based on natural rubber and on hydrocarbon resin as tackifying agent (tackifier), have been described in U.S. Pat. No. 4,913,209, U.S. Pat. No. 5,085,942 and U.S. Pat. No. 5,295,525. These compositions are characterized by the combined presence of a high content of hydrocarbon resin, always greater than 100 parts by weight per 100 parts of solid elastomer and of a large amount of elastomer in the liquid state, generally in the form of depolymerized natural rubber (molecular weight typically between 1000 and 100,000).

First of all, such a high resin content, apart from the fact that it can be harmful to the hysteresis and consequently to the rolling resistance of the tires, requires a particularly lengthy and difficult kneading of the elastomer matrix.

The use of a large amount of liquid elastomer admittedly improves the fluidity of the composition but such a use is the source of other disadvantages, in particular of a risk of creep of the self-sealing composition during use at relatively high temperature (typically greater than 60° C.) frequently encountered during the use of some tires.

Another major manufacturing problem can also arise: in the absence of filler, such as carbon black, or at the very least of a significant amount of such a filler (furthermore undesirable, in a known way, for this type of application), the composition exhibits weak cohesion. This lack of cohesion may be such that the adhesiveness of the composition, resulting from the high content of tackifying resin employed, is no longer compensated for and prevails. This then results in a risk of undesirable adhesive bonding to the compounding equipment, which is unacceptable under industrial processing conditions.

SUMMARY OF THE INVENTION

One object of the invention is to provide a novel manufacturing process which makes it possible to overcome, at the very least to significantly reduce, the various abovementioned disadvantages.

To attain this and other objects, one aspect of the present invention relates to a process for the manufacture of an elastomer composition having a self-sealing property which is based on at least (phr meaning parts by weight per 100 parts of solid elastomer):

a blend of at least two solid elastomers, a polybutadiene or butadiene copolymer elastomer, referred to as "elastomer A", and a natural rubber or synthetic polyisoprene elastomer, referred to as "elastomer B", the elastomer A:elastomer B ratio by weight being within a range from 10:90 to 90:10;

between 30 and 90 phr of a hydrocarbon resin;

from 0 to less than 30 phr of filler, in which, during a first stage or stage (a), a masterbatch comprising at least the elastomers A and B and between 30 and 90 phr of a hydrocarbon resin is prepared by mixing these various components in a mixer at a "hot compounding" temperature or up to a "hot compounding" temperature which is greater than the softening temperature of the hydrocarbon resin.

Such a process has proven to be particularly well suited to the rapid manufacture, under processing conditions acceptable from the industrial viewpoint, of a high-performance self-sealing composition based on solid diene elastomer and hydrocarbon resin, it being possible for this composition to comprise high contents of hydrocarbon resin without requiring the use of elastomer in the liquid state as plasticizer.

Figure 2:
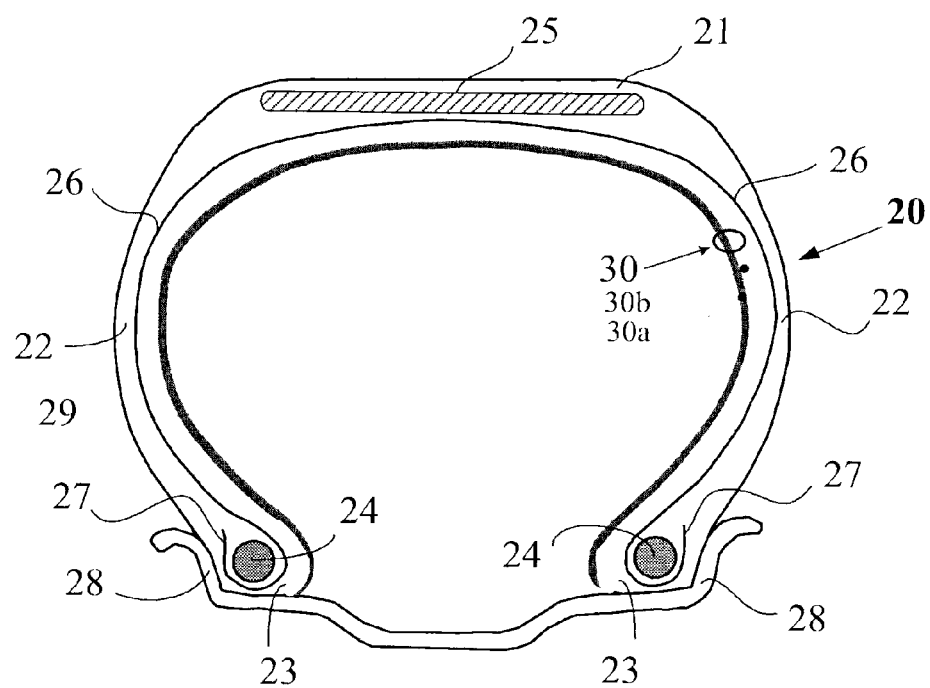

The invention and its advantages will be easily understood in the light of the description and implementational examples which follow, and of FIGS. 1 and 2 relating to these examples, which give a simple diagrammatic representation, without observing a specific scale, of:

FIG. 1 shows an example of an extrusion-compounding device which can be used for the implementation of a process in accordance with the invention; and FIG. 2 shows in radial cross section, an example of a tire using a self-sealing composition prepared according to the process in accordance with the invention.

I. DETAILED DESCRIPTION

I-1. Definitions

In the present description, unless expressly indicated otherwise, all the percentages (%) indicated are % by weight.

Furthermore, any interval of values denoted by the expression "between a and b" represents the range of values greater than "a" and lower than "b" (that is to say, limits a and b excluded), whereas any interval of values denoted by the expression "from a to b" means the range of values ranging from "a" up to "b" (that is to say, including the strict limits a and b).

The abbreviation "phr" means parts by weight per hundred parts of elastomer in the solid state (of the total of the solid elastomers, if several solid elastomers are present).

The expression composition "based on" should be understood as meaning, generally, a composition comprising the mixture and/or the reaction product of its various components, it being possible for some of these components to be capable of reacting (indeed even intended to react) with one another, at least in part, during the various phases of manufacture of the composition, for example during its possible final crosslinking or vulcanization (curing).

Elastomer (or "rubber", the two being regarded as synonyms) of the "diene" type should be understood as meaning, in a known way, an elastomer resulting at least in part (i.e., a homopolymer or a copolymer) from diene monomers (i.e., from monomers carrying two carbon-carbon double bonds, whether conjugated or nonconjugated).

These diene elastomers can be classified into two categories, saturated or unsaturated. In the present patent application, "unsaturated" diene elastomer is understood to mean a diene elastomer resulting at least in part from conjugated diene monomers and having a content of units resulting from conjugated dienes which is greater than 30% (mol %). Thus it is that diene elastomers such as butyl rubbers or copolymers of dienes and of α-olefins of EPDM type, which can be described as "saturated" diene elastomers due to their reduced content of units of diene origin (always less than 15 mol %), are excluded from the preceding definition. The commonest diene elastomers of the unsaturated type are those selected from the group consisting of polybutadienes, natural rubber, synthetic polyisoprenes, butadiene copolymers, isoprene copolymers and the mixtures of such elastomers.

I-2. Measurements

I-2-A. Mooney Viscosity

The Mooney viscosity or plasticity characterizes, in a known way, solid substances. Use is made of an oscillating consistometer as described in Standard ASTM D1646 (1999). The Mooney plasticity measurement is carried out according to the following principle: the sample, analysed in the raw state (i.e., before curing), is moulded (formed) in a cylindrical chamber heated to a given temperature (for example 35° C. or 100° C.). After preheating for one minute, the rotor rotates within the test specimen at 2 revolutions/minute and the working torque for maintaining this movement is measured after rotating for 4 minutes. The Mooney viscosity (ML 1+4) is expressed in "Mooney unit" (MU, with 1 MU=0.83 newton·meter).

I-2-B. Brookfield Viscosity

The Brookfield viscosity characterizes, in a known way, liquid substances. The apparent viscosity according to the Brookfield method is measured at a given temperature (for example at 65° C.) according to European and International Standard EN ISO 2555 (1999). Use is made, for example, of a viscometer of the A type (for example RVT model) or of the B type (for example HAT model) at a rotational frequency preferably equal to 10 or 20 $\text{min}^{-1}$, with a No. of the spindle (1 to 7) suitable for the viscosity range measured (according to Appendix A of Standard EN ISO 2555).

I-2-C. Macrostructure of the Elastomers

The macrostructure (Mw, Mn and PI) and the distribution of the molar masses of an elastomer, whether in the liquid state or in the solid state, are characteristics known to a person skilled in the art, available in particular from the suppliers of elastomers, which can furthermore be measured by conventional techniques, such as GPC (Gel Permeation Chromatography) or SEC (Size Exclusion Chromatography).

To recapitulate, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, for example tetrahydrofuran, at a concentration of 1 g/liter. The solution is then filtered through a filter, for example with a porosity of 0.45 μm, before injection into the apparatus. The apparatus used is, for example, a "Waters Alliance" chromatographic line. The elution solvent is, for example, tetrahydrofuran, the flow rate is 0.7 ml/min and the temperature of the system is 35° C. A set of 4 "Waters" columns in series (names "Styragel HMW7", "Styragel HMW6E" and two "Styragel HT6E") is, for example, used. The injected volume of the solution of the polymer sample is, for example, 100 μl. The detector is a differential refractometer (for example "Waters 2410") which can be equipped with associated software for making use of the data (for example "Waters Millennium"). A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses).

I-2-D. Macrostructure of the Hydrocarbon Resins

The macrostructure (Mw, Mn and PI) is determined by SEC as indicated above for the elastomers: solvent tetrahydrofuran, temperature 35° C., concentration 1 g/liter, flow rate 1 ml/min, solution filtered through a filter with a porosity of 0.45 μm before injection (100 μl); Moore calibration with polystyrene standards; set of 3 "Waters" columns in series ("Styragel HR4E", "Styragel HR1" and "Styragel HR 0.5"), detection by differential refractometer (for example "Waters 2410") which can be equipped with operating software (for example "Waters Millennium").

All the values for molar masses shown in the present application are thus relative to calibration curves produced with polystyrene standards. All the values for glass transition temperature ("Tg") are measured in a known way by DSC (Differential Scanning calorimetry) according to Standard ASTM D3418 (1999).

I-3. Process of the Invention

The process in accordance with the invention thus has the essential characteristic of comprising a first stage or stage (a)

during which a masterbatch comprising at least the elastomers A and B and between 30 and 90 phr of hydrocarbon resin is prepared by mixing these various components in a mixer at a "hot compounding" temperature or up to a "hot compounding" temperature which is greater than the softening temperature of the hydrocarbon resin.

The hot compounding temperature above is, of course, that of the masterbatch measurable in situ and not the set temperature of the mixer itself.

"Masterbatch" or "intermediate composition" should be understood as meaning the mixture of at least the elastomer matrix (in this case, the two elastomers A and B) with the hydrocarbon resin, the precursor mixture of the final ready-for-use self-sealing composition.

Various additives can optionally be incorporated in this masterbatch, whether they are intended for the masterbatch proper (for example, a stabilizing agent, a colouring agent, a UV stabilizer, an antioxidant, and the like) or for the final self-sealing composition for which the masterbatch is intended.

The masterbatch can be manufactured in any compounding equipment, in particular in a blade mixer, an open mill, an extruding machine or any mixer capable of sufficiently mixing or kneading its various components until a homogeneous intimate mixture of the said components is obtained. Preferably, use is made of a compounding screw extruder, having or not having a constant pitch, capable in a known way of introducing significant shearing of the mixture (at least diene elastomer and resin) being formed.

In the initial state, that is to say before contact thereof with the elastomers, the hydrocarbon resin can exist in the solid state or in the liquid state. During the operation in which the elastomers A and B (solids) and the hydrocarbon resin are brought into contact, the latter can be in the solid state or, according to a more preferred embodiment, already in the liquid state; it is sufficient for this to heat the resin to a temperature greater than its softening temperature.

According to the type of hydrocarbon resin used, the maximum hot compounding temperature is preferably greater than 70° C., preferably greater than 80° C., for example between 100° C. and 150° C.

For optimum compounding of the masterbatch, the hydrocarbon resin is preferably injected in the liquid state, under pressure, into the mixer. According to another preferred embodiment, in combination or not in combination with the above, the hot compounding stage (a) is carried out with the exclusion of oxygen. The injection of the resin under pressure, at a temperature at which the resin is completely molten, has the advantage of introducing, into the compounding chamber of the mixer, a degassed resin which is more stable mechanically and chemically.

According to a preferred embodiment, the process of the invention comprises at least one subsequent stage or stage (b) during which a crosslinking agent is incorporated in the masterbatch thus prepared, preferably in its entirety or for at least 50% by weight, everything being mixed in the same mixer or in a different mixer.

The stage (b) of incorporation of all or part of the crosslinking agent can be carried out on the same mixer as that of the stage (a) which precedes, preferably a compounding screw extruder, or else on another type of mixer, for example another compounding screw extruder or an external mixer of the two-roll open mill type.

According to a preferred embodiment, in particular when an external mixer of the two-roll open mill type is used, stage (b) is carried out at a maximum temperature or up to a maximum temperature which is kept lower than the softening temperature of the resin, in order to limit the risks of excessive undesirable adhesive bonding of the masterbatch to the compounding equipment. Thus, according to the type of hydrocarbon resin used, the compounding temperature of stage (b) can preferably be less than 50° C., more preferably between 20° C. and 40° C.

According to another specific embodiment, independently of the softening temperature of the resin, this being the case whatever the compounding equipment used for stage (b), the latter is carried out at a maximum temperature or up to a maximum temperature which is kept lower than 130° C., preferably lower than 100° C., in particular lower than 80° C.

If need be, an intermediate stage of cooling the masterbatch can be inserted between stages (a) and (b) described above, in order to bring its temperature to the value desired before beginning stage (b), whether a targeted temperature lower than the softening temperature of the resin or, independently, a targeted temperature lower than 130° C., preferably lower than 100° C., in particular lower than 80° C., this before introduction (stage (b)) of the crosslinking agent into the masterbatch manufactured previously.

When a filler, such as carbon black, is used, it can be introduced during stage (a), that is to say at the same time as the solid unsaturated diene elastomer and the hydrocarbon resin, or else during a stage subsequent to stage (a), preferably during stage (b) of incorporation of all or part of the crosslinking agent. It has been found that a very small proportion of carbon black, preferably between 0.5 and 2 phr, further improved the compounding and the manufacture of the composition, and its final extrudability.

The process described above makes it possible to prepare a composition capable of performing an effective puncture-resistant role with respect to the inflatable articles in which it is used. In particular, it does not require the addition of a liquid plasticizer, such as a liquid elastomer, which can be harmful, as has already been said in the introduction to the present statement, when such a plasticizer is used in a large amount, to the fluidity properties and thus can result in risks of excessive creep of the composition when used at a relatively high temperature.

However, according to a specific embodiment of the invention, it can be of use in some cases, according to the specific application targeted, to add a stage of incorporation of a liquid plasticizer (liquid at 23° C.), referred to as "low Tg" plasticizer, preferably in a small amount (content of less than 60 phr), the role of which is to soften the self-sealing composition by diluting the diene elastomer matrix and the hydrocarbon resin, which can improve in particular the "cold" self-sealing performance (that is to say, typically for a temperature of less than 0° C.); its Tg is by definition less than −20° C. and is preferably less than −40° C.

The optional liquid plasticizer can be incorporated at any time, in all or part, during any one of the stages of the process, in particular during the stage (a) of manufacture of the masterbatch itself (in this case, before, during or after the incorporation of the hydrocarbon resin in the blend of elastomers A and B), "hot" (that is to say, at a temperature greater than the softening temperature of the resin) or at a lower temperature, or, for example, after the manufacture of the masterbatch (in this case, before, during or after addition of the crosslinking agent, indeed even during the final forming (extrusion) of the composition).

According to a specific embodiment, the liquid plasticizer is introduced, for example, at least in part, during the stage (a) of manufacture of the masterbatch itself, more preferably in this case either at the same time as the hydrocarbon resin or after introducing the latter. According to an advantageous embodiment, a mixture of the hydrocarbon resin and of the liquid plasticizer can be prepared prior to the incorporation in the solid diene elastomer matrix.

According to another specific embodiment, the liquid plasticizer is introduced, for example, at least in part, during the stage (b) of incorporation of all or part of the crosslinking agent.

According to another specific embodiment, the liquid plasticizer can be incorporated, in all or part, during a stage (c) subsequent to stage (b), that is to say after incorporation of all or part of the crosslinking agent, in the same mixer or a different mixer from that of stage (b), whether, for example, a compounding screw extruder or an external mixer of the two-roll open mill type. This incorporation is possible on the same external mixer but it can be advantageous to use a compounding screw extruder into which the mixture resulting from stage (b) and then the liquid plasticizer are introduced, such a compounding screw extruder being equipped with a zone in which strong shearing is applied and thus making possible good homogenization of the final self-sealing composition.

According to another specific embodiment, if not all of the crosslinking agent is introduced during stage (b), then the remainder of this crosslinking agent can be introduced in stage (a) or in the additional stage (c) described above.

It is also possible to successively carry out all the stages of manufacture of the self-sealing composition with just one device, a compounding screw extruder equipped with means for introducing and metering the various constituents positioned in offset fashion along the compounding chamber, with appropriate homogenization zones and with a die suited to the semi-finished. This makes it possible to carry out, with one and the same device, all the stages of preparation of the self-sealing composition.

On exiting from stage (b) or optionally from stage (c) described above, the final self-sealing composition is completed; it is formed dimensionally in a way known per se, for example by extrusion through a die with dimensions suited to the semi-finished product chosen, for example in the form of a relatively wide rubber layer, a narrow strip or a profiled element capable of being directly used in the assembling of a tire blank or also a strip which can be reused subsequently in an extrusion device.

I-4. Formulation of the Composition having a Self-Sealing Property

The self-sealing composition or material capable of being prepared according to the process of the invention is thus an elastomer composition comprising at least the solid elastomers A and B, between 30 and 90 phr of a hydrocarbon resin and optionally a crosslinking agent; in addition to various optional additives, it may or may not comprise a small fraction (less than 30 phr) of optional filler. Its formulation is described in more detail below.

a) Diene Elastomers A and B

The self-sealing composition prepared according to the process of the invention comprises a blend (or "mixture") of at least two solid elastomers:

(i) at least one (that is to say, one or more) polybutadiene or butadiene copolymer, referred to as "elastomer A", and (ii) at least one (that is to say, one or more) natural rubber or synthetic polyisoprene, referred to as "elastomer B".

Mention may in particular be made, as polybutadienes, of those having a content of 1,2-units of between 4 and 80% or those having a cis-1,4-content of greater than 80%. Mention may in particular be made, as butadiene copolymers, of butadiene-stirene copolymers (SBRs), butadiene-isoprene copolymers (BIRs) or stirene-butadiene-isoprene copolymers (SBIRs). SBR copolymers having a stirene content of between 5 and 50% by weight and more particularly between 20 and 40% by weight, a content of 1,2-bonds of the butadiene part of between 4 and 65% and a content of trans-1,4-bonds of between 20 and 80%, BIR copolymers having an isoprene content of between 5 and 90% by weight and a Tg of $-40°$ C. to $-80°$ C., SBIR copolymers having a stirene content of between 5 and 50% by weight and more particularly of between 10 and 40% by weight, an isoprene content of between 15 and 60% by weight and more particularly between 20 and 50% by weight, a butadiene content of between 5 and 50% by weight and more particularly of between 20 and 40% by weight, a content of 1,2-units of the butadiene part of between 4 and 85%, a content of trans-1,4-units of the butadiene part of between 6 and 80%, a content of 1,2-plus 3,4-units of the isoprene part of between 5 and 70% and a content of trans-1,4-units of the isoprene part of between 10 and 50%, and more generally any SBIR copolymer having a Tg of between $-20°$ C. and $-70°$ C., are suitable in particular.

More preferably still, the elastomer A is a butadiene homopolymer, in other words a polybutadiene, this polybutadiene preferably having a content (mol %) of cis-1,4-bonds of greater than 90%, more preferably greater than 95%.

The elastomer B is natural rubber or a synthetic polyisoprene; use is preferably made, among synthetic polyisoprenes, of cis-1,4-polyisoprenes, preferably those having a content (mol %) of cis-1,4-bonds of greater than 90%, more preferably still of greater than 95%, in particular of greater than 98%.

The above elastomers A and B can, for example, be block, random, sequential or microsequential elastomers and can be prepared in dispersion or in solution; they can be coupled and/or star-branched and/or branched or also functionalized, for example with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Mention may also be made, as other examples of such functionalized elastomers, of elastomers (such as SBR, BR, NR or IR) of the epoxidized type.

According to a preferred embodiment of the invention, the elastomer A:elastomer B ratio by weight is preferably within a range from 20:80 to 80:20, more preferably still within a range from 30:70 to 70:30, in particular from 40:60 to 60:40.

It is in such respective concentration ranges of the two elastomers A and B that the best compromises in terms of self-sealing properties and operating temperature have been observed, according to the different specific uses targeted, in particular during use at low temperature (in particular at a temperature of less than $0°$ C.), in comparison with the use of natural rubber alone or of polybutadiene alone.

The elastomers A and B are by definition solid. In contrast to liquid, solid is understood to mean any substance not having the ability to eventually assume, at the latest after 24 hours, solely under the effect of gravity and at ambient temperature (23° C.), the shape of the container in which it is present.

In contrast to elastomers of the liquid type which can optionally be used as liquid plasticizers in the composition prepared according to the process of the invention, the elastomers A and B and their blend are characterized by a very high viscosity: their Mooney viscosity in the raw state (i.e., noncrosslinked state) ML (1+4), measured at 100° C., is preferably greater than 20, more preferably greater than 30, in particular between 30 and 130.

According to another possible definition, solid elastomer is also understood to mean an elastomer having a high molar mass, that is to say typically exhibiting a number-average molar mass (Mn) which is greater than 100,000 g/mol; preferably, in such a solid elastomer, at least 80%, more preferably at least 90%, of the area of the distribution of the molar masses (measured by SEC) is situated above 100,000 g/mol.

Preferably, the number-average molar mass (Mn) of each of the elastomers A and B is between 100,000 and 5,000,000 g/mol, more preferably between 150,000 and 4,000,000 g/mol; in particular, it is between 200,000 and 3,000,000 g/mol, more particularly between 200,000 and 1,500,000 g/mol. Preferably, their polydispersity index PI (Mw/Mn) is between 1.0 and 10.0, in particular between 1.0 and 3.0 as regards the elastomer A and between 3.0 and 8.0 as regards the elastomer B.

According to a preferred embodiment of the invention, the above blend of solid elastomers A and B constitutes the only solid elastomer present in the self-sealing composition, that is to say that the overall content of the two elastomers A and B is then 100 phr; in other words, the contents of elastomer A and elastomer B are consequently each within a range from 10 to 90 phr, preferably from 20 to 80 phr, more preferably from 30 to 70 phr, in particular from 40 to 60 phr.

According to another specific embodiment of the invention, when the blend of elastomers A and B does not constitute the only solid elastomer of the self-sealing composition, then this blend preferably constitutes the predominant solid elastomer by weight in the composition; more preferably, the overall content of the two elastomers A and B is then greater than 50 phr, more preferably greater than 70 phr, in particular greater than 80 phr.

Thus, according to specific embodiments of the invention, the blend of elastomers A and B might be combined with other (solid) elastomers which are minor components by weight, whether unsaturated or saturated diene elastomers (for example butyl elastomers) or elastomers other than diene elastomers, for example thermoplastic styrene elastomers (referred to as "TPSs"), for example selected from the group consisting of stirene/butadiene/stirene (SBS), stirene/isoprene/stirene (SIS), stirene/butadiene/isoprene/stirene (SBIS), stirene/isobutylene/stirene (SIBS), stirene/ethylene/butylene/stirene (SEBS), stirene/ethylene/propylene/stirene (SEPS) and stirene/ethylene/ethylene/propylene/stirene (SEEPS) block copolymers, and the mixtures of these copolymers.

Surprisingly, the above blend of elastomers A and B, which is devoid of filler (or with a very low content of filler), has proved to be capable, after addition of a thermoplastic hydrocarbon resin within the recommended narrow range, of fulfilling the function of an effective self-sealing composition, as is explained in detail in the continuation of the account.

b) Hydrocarbon Resin

The second essential constituent of the self-sealing composition is a hydrocarbon resin. The designation "resin" is reserved in the present patent application, by definition known to a person skilled in the art, for a compound which is solid at ambient temperature (23° C.), in contrast to a liquid plasticizing compound, such as an oil.

Hydrocarbon resins are polymers well known to a person skilled in the art, essentially based on carbon and hydrogen, which can be used in particular as plasticizing agents or tackifying agents in polymer matrices. They are by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, VCH, 1997, ISBN 3-527-28617-9), Chapter 5 of which is devoted to their applications, in particular in the tire rubber field (5.5. "*Rubber Tires and Mechanical Goods*"). They can be aliphatic, cycloaliphatic, aromatic, hydrogenated aromatic, of the aliphatic/aromatic type, that is to say based on aliphatic and/or aromatic monomers. They can be natural or synthetic and may or may not be oil-based (if such is the case, they are also known under the name of petroleum resins). Their Tg is preferably greater than 0° C., in particular greater than 20° C. (generally between 30° C. and 95° C.).

In a known way, these hydrocarbon resins can also be described as thermoplastic resins in the sense that they soften on heating and can thus be moulded. They can also be defined by a softening point or temperature, at which temperature the product, for example in the powder form, sticks together; this datum tends to replace the melting point, which is rather poorly defined, for resins in general. The softening temperature of a hydrocarbon resin is generally greater by approximately 50 to 60° C. than its Tg value.

The softening temperature of the resin is preferably greater than 40° C. (in particular between 40° C. and 140° C.), more preferably greater than 50° C. (in particular between 50° C. and 135° C.).

The said resin is used at a content by weight of between 30 and 90 phr. Below 30 phr, the puncture-resistant performance has proved to be inadequate due to an excessively high stiffness of the composition, whereas, above 90 phr, exposure to an inadequate mechanical strength of the material exists with in addition a risk of a damaged performance at high temperature (typically greater than 70° C.). For these reasons, the content of resin is preferably between 40 and 80 phr, more preferably still at least equal to 45 phr, in particular within a range from 45 to 75 phr.

According to a preferred embodiment of the invention, the hydrocarbon resin exhibits at least any one, more preferably all, of the following characteristics:
- a Tg of greater than 25° C.;
- a softening point of greater than 50° C. (in particular of between 50° C. and 135° C.);
- a number-average molar mass (Mn) of between 400 and 2000 g/mol;
- a polydispersity index (PI) of less than 3 (reminder: PI=Mw/Mn with Mw the weight-average molar mass).

More preferably, this hydrocarbon resin exhibits at least any one, more preferably all, of the following characteristics:
- a Tg of between 25° C. and 100° C. (in particular between 30° C. and 90° C.);
- a softening point of greater than 60° C., in particular of between 60° C. and 135° C.;
- an average mass Mn of between 500 and 1500 g/mol;
- a polydispersity index PI of less than 2.

The softening point is measured according to Standard ISO 4625 ("Ring and Ball" method). The macrostructure (Mw, Mn and PI) is determined by steric exclusion chromatography (SEC) as indicated in the introduction to the patent application.

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstirene homopolymer or copolymer resins, and the mixtures of these resins. Mention may more particularly be made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins, and the mixtures of these resins.

The term "terpene" combines here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Suitable as vinylaromatic monomer are, for example, stirene, α-methylstirene, ortho-methylstirene, meta-methylstirene, para-methylstirene, vinyltoluene, para-(tert-butyl)stirene, methoxystirenes, chlorostirenes, hydroxystirenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/stirene copolymer resins, polylimonene resins, limonene/stirene copolymer resins, limonene/D(CPD) copolymer resins, $C_5$ fraction/stirene copolymer resins, $C_5$ fraction/$C_9$ fraction copolymer resins, and the mixtures of these resins.

All the above resins are well known to a person skilled in the art and are commercially available, for example sold by DRT under the name "Dercolyte" as regards the polylimonene resins, by Neville Chemical Company under the name "Super Nevtac", by Kolon under the name "Hikorez" or by Exxon Mobil under the name "Escorez" as regards the $C_5$ fraction/stirene resins or $C_5$ fraction/$C_9$ fraction resins, or by Struktol under the name "40 MS" or "40 NS" (mixtures of aromatic and/or aliphatic resins).

c) Crosslinking Agent

The composition prepared according to the process of the invention has in addition the optional characteristic of comprising a crosslinking agent for the blend of solid elastomers A and B. This optional crosslinking agent is preferably a crosslinking agent based on sulphur or a sulphur donor. In other words, this crosslinking agent is a "vulcanization" agent.

According to a preferred embodiment, the vulcanization agent comprises sulphur and, as vulcanization activator, a guanidine derivative, that is to say a substituted guanidine. Substituted guanidines are well known to a person skilled in the art (see, for example, WO 00/05300): mention will be made, as nonlimiting examples, of N,N'-diphenylguanidine (abbreviated to "DPG"), triphenylguanidine or di(o-tolyl)guanidine. Use is preferably made of DPG. The sulphur content is, for example, between 0.1 and 1.5 phr, in particular between 0.2 and 1.2 phr (in particular between 0.2 and 1.0 phr), and the content of guanidine derivative is itself between 0 and 1.5 phr, in particular between 0 and 1.0 phr (especially within a range from 0.2 to 0.5 phr).

The said crosslinking or vulcanization agent does not require the presence of a vulcanization accelerator. According to a preferred embodiment, the composition can thus be devoid of such an accelerator or at the very most can comprise less than 1 phr thereof, more preferably less than 0.5 phr thereof.

However, in general, if such an accelerator is used, mention may be made, as example, of any compound ("primary" or "secondary" accelerator) capable of acting as vulcanization accelerator for diene elastomers in the presence of sulphur, in particular accelerators of the thiazole type and their derivatives, accelerators of sulphenamide, thiuram, dithiocarbamate, dithiophosphate, thiourea and xanthate types. Mention may in particular be made, as examples of such accelerators, of the following compounds: 2-mercaptobenzothiazyl disulphide (abbreviated to "MBTS"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC"), 1-phenyl-2,4-dithiobiuret ("DTB"), zinc dibutyl phosphorodithioate ("ZBPD"), zinc 2-ethylhexyl phosphorodithioate ("ZDT/S"), bis[O,O-di(2-ethylhexyl)thiophosphonyl]disulphide ("DAPD"), dibutylthiourea ("DBTU"), zinc isopropyl xanthate ("ZIX") and the mixtures of these compounds. According to another advantageous embodiment, the above vulcanization system can be devoid of zinc or of zinc oxide (known as vulcanization activators) or at the very most can comprise less than 1 phr thereof, more preferably less than 0.5 phr thereof.

According to another preferred embodiment of the invention, the vulcanization agent comprises a sulphur donor. The amount of such a sulphur donor will be adjusted preferably to between 0.5 and 15 phr, more preferably between 0.5 and 10 phr (in particular between 1 and 5 phr), in particular so as to achieve the preferred equivalent sulphur contents indicated above. Sulphur donors are well known to a person skilled in the art; mention will in particular be made of thiuram polysulphides, which are known vulcanization accelerators and which have the formula (I):

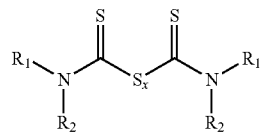

in which:
  x is a number (integer, or decimal number in the case of mixtures of polysulphides) which is equal to or greater than two, preferably within a range from 2 to 8;
  $R_1$ and $R_2$, which are identical or different, represent a hydrocarbon radical preferably chosen from alkyls having from 1 to 6 carbon atoms, cycloalkyls having from 5 to 7 carbon atoms, or aryls, aralkyls or alkaryls having from 6 to 10 carbon atoms.

In the above formula (I), $R_1$ and $R_2$ might form a divalent hydrocarbon radical comprising from 4 to 7 carbon atoms.

These thiuram polysulphides are more preferably selected from the group consisting of tetrabenzylthiuram disulphide ("TBzTD"), tetramethylthiuram disulphide ("TMTD"), dipentamethylenethiuram tetrasulphide ("DPTT"), and the mixtures of such compounds. Use is more preferably made of TBzTD, particularly at the preferred contents indicated above for a sulphur donor (i.e., between 0.1 and 15 phr, more preferably between 0.5 and 10 phr, in particular between 1 and 5 phr).

After curing, such a crosslinking agent has proved to contribute sufficient cohesion to the composition, without conferring a true crosslinking thereon: the crosslinking which can be measured, via a conventional inflation method known to a person skilled in the art, in fact is close to the detection threshold.

d) Filler

The composition prepared according to the process of the invention has the other characteristic of not comprising a filler or comprising a very small amount of filler, that is to say of comprising from 0 to less than 30 phr of at least one (that is to say, one or more) such optional filler.

Filler is understood here to mean any type of filler, whether reinforcing (typically having nanometric particles, with a weight-average size preferably of less than 500 nm, in particular between 20 and 200 nm) or nonreinforcing or inert (typically having micrometric particles, with a weight-average size of greater than 1 μm, for example between 2 and 200 μm).

These reinforcing or nonreinforcing fillers are essentially only present to give dimensional stability, that is to say a minimum mechanical strength, to the final composition. Less thereof is preferably placed in the composition in proportion as the filler is known to be reinforcing with respect to an elastomer, in particular a diene elastomer, such as natural rubber or polybutadiene.

An excessively high amount, in particular of greater than 30 phr, no longer makes it possible to achieve the minimum required properties of flexibility, deformability and ability to creep. For these reasons, use is preferably made of from 0 to less than 20 phr, more preferably from 0 to less than 10 phr, of filler.

Mention will in particular be made, as examples of fillers known as reinforcing to a person skilled in the art, of carbon black or of a reinforcing inorganic filler, such as silica, or a blend of these two types of filler.

All carbon blacks are suitable as carbon blacks, for example, in particular the blacks conventionally used in tires. Mention will for example be made, among the latter, of carbon blacks of 300, 600, 700 or 900 grade (ASTM) (for example, N326, N330, N347, N375, N683, N772 or N990). Suitable in particular as reinforcing inorganic fillers are highly dispersible mineral fillers of the silica ($SiO_2$) type, in particular precipitated or pyrogenic silicas exhibiting a BET specific surface of less than 450 $m^2/g$, preferably from 30 to 400 $m^2/g$.

Mention will in particular be made, as examples of fillers known as nonreinforcing or inert to a person skilled in the art, of ashes (i.e., combustion residues), microparticles of natural calcium carbonates (chalk) or synthetic calcium carbonates, of synthetic silicates or natural silicates (such as kaolin, talc, mica), or of ground silicas, titanium oxides, aluminas or aluminosilicates. Mention may also be made, as examples of lamellar fillers, of graphite particles. Colouring fillers or fillers coloured, for example, by pigments can advantageously be used to colour the composition according to the colour desired.

The physical state under which the filler is provided is not important, whether in the form of a powder, microspheres, granules, beads or any other appropriate densified form. Of course, filler is also understood to mean mixtures of different reinforcing and/or nonreinforcing fillers.

A person skilled in the art will be able, in the light of the present description, to adjust the content of filler of the composition in order to achieve the property levels desired and to adjust the formulation to the specific application envisaged.

According to a specific and advantageous embodiment of the invention, if a reinforcing filler is present in the composition, its content is preferably less than 5 phr (i.e., between 0 and 5 phr), in particular less than 2 phr (i.e., between 0 and 2 phr). Such contents have proved to be particularly favourable to the process for the manufacture of the self-sealing composition, while providing the latter with an excellent self-sealing performance. Use is more preferably made of a content of between 0.5 and 2 phr, in particular when carbon black is concerned.

e) Liquid Plasticizer

Any liquid elastomer or any extending oil, whether of aromatic or nonaromatic nature, more generally any liquid plasticizing agent known for its plasticizing properties with respect to elastomers, in particular diene elastomers, can be used. At ambient temperature (23° C.), these plasticizers or these oils, which are more or less viscous, are liquids, in contrast in particular to hydrocarbon resins, which are by nature solid at ambient temperature.

To recapitulate, in contrast to a solid, liquid is understood to mean any substance having the ability to eventually assume, at the latest after 24 hours, solely under the effect of gravity and at ambient temperature (23° C.), the shape of the container in which it is present.

In contrast to solid elastomers, liquid plasticizers and elastomers (i.e., having a low molar mass) are characterized by a very low viscosity: preferably, their Brookfield viscosity, measured at 65° C., is less than 2,000,000 cP (cP meaning centipoise; 1 cP is equal to 1 mPa·s), more preferably less than 1,500,000 cP; it is in particular between 200 and 1,000,000 cP, typically, as regards liquid elastomers, between 2000 and 1,000,000 cP).

According to another possible definition, liquid elastomer is also understood to mean an elastomer for which the number-average molar mass (Mn) is less than 100,000 g/mol; preferably, in such a liquid elastomer, at least 80% and more preferably at least 90% of the area of the distribution of the molar masses (measured by SEC) is situated below 100,000 g/mol.

Suitable in particular are liquid elastomers for which the number-average molar mass (Mn) is between 400 and 90,000 g/mol, more generally between 800 and 90,000 g/mol, for example in the form of liquid BR, liquid SBR, liquid IR or liquid depolymerized natural rubber, such as are described, for example, in the abovementioned patent documents U.S. Pat. No. 4,913,209, U.S. Pat. No. 5,085,942 and U.S. Pat. No. 5,295,525. If a liquid diene elastomer (for example liquid NR, liquid IR or liquid BR) is used as plasticizer, it can optionally be generated in situ, that is to say during the actual manufacture of the self-sealing composition, for example by an appropriate (thermo)mechanical working (depolymerization by chain breakage) of the starting solid elastomers. Use may also be made of mixtures of such liquid elastomers with oils, such as described below.

Extending oils, in particular those selected from the group consisting of polyolefin oils (that is to say, resulting from the polymerization of olefins, monoolefins or diolefins, for example of the polyethylene glycol or polypropylene glycol type), paraffinic oils, naphthenic oils (of low or high viscosity and hydrogenated or nonhydrogenated), aromatic or DAE (Distillate Aromatic Extracts) oils, MES (Medium Extracted Solvates) oils, TDAE (Treated Distillate Aromatic Extracts) oils, mineral oils, vegetable oils (and their oligomers, e.g., palm, rapeseed, soybean or sunflower oils) and the mixtures of these oils, are also suitable.

According to a specific embodiment, use is made, for example, of an oil of the polybutene type, in particular a polyisobutylene (abbreviated to "PIB") oil, which has demonstrated an excellent compromise in properties in comparison with the other oils tested, in particular with a conventional oil of the paraffinic type. By way of examples, PIB oils are sold in particular by Univar under the name "Dynapak Poly" (e.g. "Dynapak Poly 190") and by BASF under the "Glissopal" (e.g. "Glissopal 1000") or "Oppanol" (e.g. "Oppanol B12") names; paraffinic oils are sold, for example, by Exxon under the name "Telura 618" or by Repsol under the name "Extensol 51".

Also suitable as liquid plasticizers are ether, ester, phosphate or sulphonate plasticizers, more particularly those selected from esters and phosphates. Mention may be made, as preferred phosphate plasticizers, of those which comprise between 12 and 30 carbon atoms, for example trioctyl phosphate. Mention may in particular be made, as preferred ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may be made, among the above triesters, as preferred glycerol triesters, of those which are composed predominantly (for more than 50% by weight, more preferably for more than 80% by weight) of an unsaturated $C_{18}$ fatty acid, that is to say a fatty acid selected from the group consisting of oleic acid, linoleic acid, linolenic acid and the mixtures of these acids. More preferably, whether of synthetic or natural origin (the case, for example, of sunflower or rapeseed vegetable oils), the fatty acid used is composed, for more than 50% by weight, more preferably still for more than 80% by weight, of oleic acid. Such triesters (trioleates) having a high content of oleic acid are well known—they have been described, for example, in Application WO 02/088238 (or US 2004/0127617)—as plasticizing agents in tire treads.

The number-average molar mass (Mn) of the liquid plasticizers other than liquid elastomers is preferably between 400 and 25,000 g/mol, more preferably still between 800 and 10,000 g/mol (measured by SEC, as indicated above for the hydrocarbon resin). For excessively low Mn masses, there can exist a risk of migration of the plasticizer to the outside of the composition, whereas excessively high masses can result in excessive stiffening of the composition. An Mn mass of between 1000 and 4000 g/mol has proved to constitute an excellent compromise for the targeted applications, in particular for use in a tire.

To sum up, the liquid plasticizer is preferably selected from the group consisting of liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and the mixtures of these compounds. More preferably, this liquid plasticizer is selected from the group consisting of liquid elastomers, polyolefin oils, vegetable oils and the mixtures of these compounds.

A person skilled in the art will be able, in the light of the description and implementational examples which follow, to adjust the amount of liquid plasticizer as a function of the nature of the latter and of the specific conditions of use of the self-sealing composition, in particular of the inflatable article in which it is intended to be used.

Preferably, the content of liquid plasticizer is within a range from 5 to 40 phr, more preferably within a range from 10 to 30 phr. Below the minima indicated, there is a risk of the elastomer composition exhibiting a stiffness which is too high for some applications, whereas, above the recommended maxima, a risk arises of insufficient cohesion of the composition and of a deterioration in the self-sealing properties.

f) Other Possible Additives

Various other additives can be added, typically in a small amount (preferably at contents of less than 20 phr, more preferably of less than 15 phr), such as, for example, protection agents, such as UV stabilizers, antioxidants or antiozonants, various other stabilizers, or colouring agents which can advantageously be used for the colouring of the self-sealing composition. According to the application targeted, fibres, in the form of short fibres or of a slurry, might optionally be added to give greater cohesion to the self-sealing composition.

In addition to the solid elastomers and other additives described above, the self-sealing composition might also comprise, preferably still according to a minor fraction by weight with respect to the blend of elastomers A and B, polymers other than elastomers, such as, for example, thermoplastic polymers.

II. IMPLEMENTATIONAL EXAMPLE OF THE INVENTION

II-1. Manufacture of the Self-Sealing Composition

By way of example, the stage (a) of manufacture of the masterbatch is preferably carried out in a compounding screw extruder as represented diagrammatically, for example, in a simple way in FIG. 1.

This FIG. 1 shows an example of a compounding screw extruder (10) essentially comprising an extrusion screw (for example a single screw) (11), a first metering pump (12) for the mixture of diene elastomers A and B (solid) and a second metering pump (13) for the resin (solid or liquid) and optionally the liquid plasticizer. The elastomer A and the elastomer B can be introduced by means of a single metering pump, if they have already been mixed together beforehand, or else can be introduced separately by means of two separate metering pumps (just one has been represented in FIG. 2, for simplicity). Likewise, the hydrocarbon resin and the optional liquid plasticizer can be introduced themselves also by means of a single metering pump, if they have already been mixed beforehand, or else can be introduced separately by means of two separate metering pumps (just one represented in FIG. 1). The metering pumps (12, 13) make it possible to increase in pressure while retaining control of the metering and the initial characteristics of the materials, the separation of the metering (elastomers and resin) and compounding functions in addition offering better control of the process.

The products, pushed by the extrusion screw, are intimately mixed under the very strong shearing contributed by the rotation of the screw, thus progressing through the mixer, for example up to a "chopper-homogenizer" part (14), at the outlet of which zone the final masterbatch (15) thus obtained, progressing in the direction of the arrow (F), is finally extruded through a die (16) which makes it possible to extrude the product at the desired dimensions. According to a specific embodiment, it can be advantageous to maintain the "chopper-homogenizer" part at a lower temperature than that of the extrusion screw, for example at a temperature of between 40° C. and 60° C., this being done in order to limit the adhesiveness of the masterbatch and thus to improve the mechanical working and the homogeneity of the masterbatch.

By way of example, the masterbatch thus extruded, which is ready to be used, can be subsequently transferred and cooled, for example on an external mixer of the two-roll open mill type, for introduction of the crosslinking agent and of the optional filler; the temperature inside the said external mixer of the two-roll open mill type is preferably kept lower than the softening temperature of the resin, furthermore preferably lower than 100° C., in particular lower than 80° C. Advantageously, the above rolls are cooled, for example by circulation of water, to a temperature of less than 40° C., preferably of less than 30° C., so as to prevent or limit undesirable adhesive bonding of the composition to the walls of the mixer.

It is possible to directly form the masterbatch at the outlet of the extrusion device (10) in order to make it easier to transport it and/or to place it on the external mixer. It is also possible to use continuous feeding of the external mixer of the two-roll open mill type.

By virtue of the preferred specific device and preferred process described above, it is possible to prepare a self-sealing composition under satisfactory industrial conditions, without the risk of contaminating the equipment due to excessive undesirable adhesive bonding of the composition to the walls of the mixers.

II-2. Use of the Self-Sealing Composition as Puncture-Resistant Layer

The self-sealing composition or material prepared according to the process of the invention is a solid compound which is characterized in particular, by virtue of its specific formulation, by very great flexibility and high deformability. Its Mooney viscosity, measured at 35° C. in the raw state (i.e., before curing), is preferably greater than 20, more preferably between 20 and 80, according to its specific formulation and the application targeted, in particular according to the presence or absence of a liquid plasticizing agent.

It can be used as puncture-resistant layer in any type of "inflatable" article, that is to say, by definition, any article which takes its useable form when inflated with air. Mention may be made, as examples of such inflatable articles, of inflatable boats, or balls used for play or sport.

It is particularly well suited to use as puncture-resistant layer in an inflatable article, a finished or semi-finished product, made of rubber, in particular in tires for a motor vehicle, such as a vehicle of the two-wheel, passenger or industrial type, or a vehicle other than a motor vehicle, such as a bicycle, more particularly in tires for passenger vehicles capable of running at very high speed or tires for industrial vehicles, such as heavy duty vehicles, capable of running and operating under particularly high internal temperature conditions.

Such a puncture-resistant layer is preferably positioned on the internal wall of the inflatable article, completely or least partially covering it, but it can also be completely incorporated into its internal structure.

The self-sealing composition described herein has the advantage of exhibiting, within a very wide range of operating temperatures for the tires, virtually no disadvantage in terms of rolling resistance in comparison with a tire not comprising a self-sealing layer. In comparison with normal self-sealing compositions, the risks of excessive creep during use at relatively high temperature (typically greater than 60° C.), a temperature frequently encountered during the use of some tires, are notably reduced; its self-sealing properties are also improved during use at low temperature (typically less than 0° C.).

By way of example, the appended FIG. 2 represents, highly schematically (without observing a specific scale), a radial cross section of a tire using a self-sealing composition prepared according to the process in accordance with the invention.

This tire 20 comprises a crown 21 reinforced by a crown reinforcement or belt 25, two sidewalls 22 and two beads 23, each of these beads 23 being reinforced with a bead wire 24. The crown 21 is surmounted by a tread, not represented in this schematic figure. A carcass reinforcement 26 is wound around the two bead wires 24 in each bead 23, the turn-up 27 of this reinforcement 26 being, for example, positioned towards the outside of the tire 20, which is here represented fitted to its wheel rim 28. The carcass reinforcement 26 is, in a way known per se, composed of at least one ply reinforced by cables, known as "radial" cables, for example of textile or metal, that is to say that these cables are positioned virtually parallel to one another and extend from one bead to the other so as to form an angle of between 80° and 90° with the median circumferential plane (plane perpendicular to the axis of rotation of the tire which is situated at mid-distance from the two beads 23 and passes through the middle of the crown reinforcement 25).

The tire 20 is characterized in that its internal wall comprises a multilayer laminate (30) comprising two layers (30a, 30b), which is self-sealing by virtue of its first layer (30a) and airtight by virtue of its second layer (30b), for example based on butyl rubber. The two layers (30a, 30b) cover substantially the entire internal wall of the tire, extending from one sidewall to the other, at least as far as the level of the rim flange when the tire is in the fitted position. The laminate is positioned here in such a way that the first self-sealing layer (30a) is radially the innermost in the tire, with respect to the other layer (30b). In other words, the self-sealing layer (30a) covers the airtight layer (30b) on the side of the internal cavity 29 of the tire 20.

In this example, the layer 30b (with a thickness of 0.7 to 0.8 mm) is based on butyl rubber and exhibits a conventional formulation for an inner liner, which normally defines, in a conventional tire, the radially internal face of the said tire intended to protect the carcass reinforcement from the diffusion of air originating from the space interior to the tire. This airtight layer 30b thus makes it possible to inflate the tire 20 and to keep it pressurized; its airtightness properties allow it to guarantee a relatively low rate of loss of pressure, making it possible to keep the tire inflated, in a normal operating state, for a sufficient period of time, normally several weeks or several months.

The layer 30a is, for its part, composed of a self-sealing composition prepared according to the process in accordance with the invention comprising, in this example, a solid unsaturated diene elastomer (blend of 50 phr of solid NR with 50 phr of solid BR; number-average molar mass Mn of the blend of elastomers equal to approximately 270,000 g/mol in the final composition); a hydrocarbon resin "Escorez 2101" from Exxon Mobil (Tg equal to approximately 44° C.; softening point equal to approximately 90° C.; Mn equal to approximately 800 g/mol; PI equal to approximately 2.1) at a content by weight of approximately 50 phr; approximately 15 phr of liquid polybutadiene elastomer ("Ricon 154" from Sartomer Cray Valley—Tg equal to approximately −20° C.; Mn equal to approximately 5000 g/mol and PI equal to approximately 1.4); and 0.5 phr of sulphur combined with 0.5 phr of DPG; in addition, it comprises a very small amount (approximately 1 phr) of carbon black (N772) and approximately 3 phr of antioxidant.

The Mooney viscosity ML (1+4) at 100° C. of the two starting elastomers, BR and NR, is respectively equal to approximately 45 and approximately 85. For each of the two elastomers, more than 80% of the area of the distribution of the molar masses (measured by SEC) is situated above 100,000 g/mol.

More specifically, the above self-sealing composition was prepared using a single-screw extruder (L/D=40), such as represented diagrammatically in FIG. 1 (already commented on above); the mixing of the base constituents (BR, NR, resin and liquid plasticizer) was carried out at a temperature (of between 100 and 130° C.) greater than the softening temperature of the resin. The extruder used comprised three different feeds (hoppers) (BR, NR, resin and liquid plasticizer mixed beforehand at a temperature of 130 to 140° C. approximately) and a pump for liquid injection under pressure for the resin (injected at a temperature of 130° C. approximately); when the elastomers A and B, the resin and the liquid plasticizer are thus intimately mixed, it was found that the undesirable adhesiveness of the composition very significantly decreased.

The above extruder was provided with a die which makes it possible to extrude the masterbatch at the desired dimensions (for example in the form of a strip) into an external mixer of the two-roll open mill type, for final incorporation of the other constituents, namely crosslinking agent, carbon black and antioxidant, at low temperature kept at a value of less than +30° C. (cooling the rolls by circulation of water).

The layer 30a, positioned, for example, in FIG. 2, between the layer 30b and the cavity 29 of the tire of FIG. 2, makes it possible to provide the tire with effective protection against pressure losses due to accidental perforations, by making possible the automatic sealing of these perforations.

If a foreign body, such as a nail, passes through the structure of the inflatable article, for example a wall, such as a sidewall, or the crown of the tire, the composition acting as self-sealing layer is subjected to several stresses. On reacting to these stresses, and by virtue of its advantageous properties of deformability and elasticity, the said composition creates an airtight contact region all around the body. It is of little significance whether the outline or profile of the latter is uniform or regular; the flexibility of the self-sealing composition allows the latter to intrude into openings of minimum size. This interaction between the self-sealing composition and the foreign body confers airtightness on the region affected by the latter.

In the event of removal, accidental or deliberate, of the foreign body, a perforation remains: the latter is capable of creating a leak of greater or lesser significance according to the size of the perforation. The self-sealing composition, subjected to the effect of hydrostatic pressure, is sufficiently flexible and deformable to seal off the perforation by being deformed, preventing inflating gas from leaking out. In the case in particular of a tire, it has turned out that the flexibility of the self-sealing composition prepared according to the process of the invention makes it possible to withstand, without any problem, the strains of the surrounding walls, even during phases in which the loaded tire deforms when running.

During trials, tires of passenger vehicle type, of 205/55 R16 size, "Michelin, Energy 3 brand", were tested. The internal wall of the tires (already comprising the airtight layer (30b) was covered with the self-sealing layer (30a) described above, with a thickness of 3 mm, and then the tires were vulcanized.

Four perforations with a diameter of 5 mm were produced on one of the fitted and inflated tires, through the tread and the crown block, using punches which were immediately removed.

Unexpectedly, this tire withstood being run on a rolling drum at 150 km/h, under a nominal load of 400 kg, without loss in pressure for more than 1500 km, after which distance running was halted.

Without a self-sealing composition and under the same conditions as above, the tire thus perforated loses its pressure in less than a minute, becoming completely unsuitable for running.

The invention claimed is:

1. A process for the manufacture of an elastomer composition having a self-sealing property comprising (phr meaning parts by weight per 100 parts of solid elastomer):
    a blend of at least two solid elastomers, a polybutadiene or butadiene copolymer elastomer, referred to as "elastomer A", and a natural rubber or synthetic polyisoprene elastomer, referred to as "elastomer B", the elastomer A:elastomer B ratio by weight being within a range from 10:90 to 90:10;
    between 30 and 90 phr of a hydrocarbon resin;
    from 0 to less than 30 phr of a filler,
    wherein, during a first stage (a), a masterbatch comprising the elastomers A and B and between 30 and 90 phr of a hydrocarbon resin is prepared by mixing these various components in a mixer at a "hot compounding" temperature or up to a "hot compounding" temperature which is greater than the softening temperature of the hydrocarbon resin.

2. The process according to claim 1, wherein, during the first stage (a), the blend of at least two solid elastomers is brought into contact with the hydrocarbon resin in the solid state.

3. The process according to claim 1, wherein, during the first stage (a), the blend of at least two solid elastomers is brought into contact with the hydrocarbon resin in the liquid state.

4. The process according to claim 3, wherein the hydrocarbon resin is injected in the liquid state into the mixer.

5. The process according to claim 1, wherein the first stage (a) for the elastomers A and B is carried out with the exclusion of oxygen.

6. The process according to claim 1, wherein the hot compounding temperature is greater than 70° C.

7. The process according to claim 1, wherein the first stage (a) is carried out in a compounding screw extruder.

8. The process according to claim 1, wherein, during at least one subsequent stage (b), a crosslinking agent is incorporated in the masterbatch thus prepared, everything being mixed in the same mixer or in a different mixer.

9. The process according to claim 8, wherein stage (b) is carried out in a compounding screw extruder.

10. The process according to claim 8, wherein stage (b) is carried out on an external mixer of the two-roll open mill type.

11. The process according to claim 8, wherein the temperature during stage (b) is kept lower than the softening temperature of the hydrocarbon resin.

12. The process according to claim 8, wherein the temperature during stage (b) is kept lower than 130° C.

13. The process according to claim 12, wherein the temperature during stage (b) is kept lower than 50° C.

14. The process according to claim 1, wherein an intermediate stage of cooling the masterbatch is inserted between stages (a) and (b), in order to cool the masterbatch to a temperature lower than the softening temperature of the hydrocarbon resin.

15. The process according to claim 1, wherein an intermediate stage of cooling the masterbatch is inserted between stages (a) and (b), in order to cool the masterbatch to a temperature lower than 130° C.

16. The process according to claim 1, wherein the elastomer A is a polybutadiene.

17. The process according to claim 16, wherein the elastomer A is a polybutadiene having a content (mol %) of cis-1,4-bonds of greater than 90%.

18. The process according to claim 1, wherein the elastomer B is natural rubber or a synthetic cis-1,4 polyisoprene.

19. The process according to claim 1, wherein the elastomer A:elastomer B ratio by weight is within a range from 20:80 to 80:20.

20. The process according to claim 1, wherein the total content of elastomer A and elastomer B is greater than 50 phr.

21. The process according to claim 1, wherein the blend of elastomers A and B constitutes the only solid elastomer of the composition.

22. The process according to claim 1, wherein the number-average molar mass Mn of each of the elastomers A and B is between 100,000 and 5,000,000 g/mol.

23. The process according to claim 1, wherein the content of hydrocarbon resin is within a range from 45 to 75 phr.

24. The process according to claim 1, wherein the hydrocarbon resin exhibits a glass transition temperature (Tg) of greater than 0° C.

25. The process according to claim 1, wherein the number-average molar mass Mn of the hydrocarbon resin is between 400 and 2000 g/mol.

26. The process according to claim 1, wherein the hydrocarbon resin is selected from the group consisting of cyclopentadiene (CPD) homopolymer or copolymer resins, dicyclopentadiene (DCPD) homopolymer or copolymer resins, terpene homopolymer or copolymer resins, terpene phenol homopolymer or copolymer resins, $C_5$ fraction homopolymer or copolymer resins, $C_9$ fraction homopolymer or copolymer resins, cc-methylstirene homopolymer or copolymer resins, and the mixtures of these resins.

27. The process according to claim 1, wherein the filler is introduced during a stage subsequent to stage (a).

28. The process according to claim 1, wherein the content of the filler is between 0 and 30 phr.

29. The process according to claim 1, wherein the filler is carbon black.

30. The process according to claim 29, wherein the content of carbon black is less than 5 phr.

31. The process according to claim 30, wherein the content of carbon black is between 005 and 2 phr.

32. The process according to claim 8, wherein the crosslinking agent comprises sulphur or a sulphur donor.

33. The process according to claim 32, wherein the crosslinking agent comprises sulphur and a guanidine derivative.

34. The process according to claim 32, wherein the sulphur donor is a thiuram polysulphide, preferably tetrabenzylthiuram disulphide (TBzTD).

35. The process according to claim 1, wherein a liquid plasticizer having a glass transition temperature (Tg) of less than −20° C. is additionally incorporated in the composition.

36. The process according to claim 35, wherein the content of liquid plasticizer is less than 60 phr.

37. The process according to claim 36, wherein the content of liquid plasticizer is within a range from 5 to 40 phr.

38. The process according to claim 35, wherein the liquid plasticizer is selected from the group consisting of liquid elastomers, polyolefin oils, naphthenic oils, paraffinic oils, DAE oils, MES oils, TDAE oils, mineral oils, vegetable oils, ether plasticizers, ester plasticizers, phosphate plasticizers, sulphonate plasticizers and the mixtures of these compounds.

39. The process according to claim 38, wherein the liquid plasticizer is selected from the group consisting of liquid elastomers, polyolefin oils, vegetable oils and the mixtures of these compounds.

40. The process according to claim 35, wherein the number-average molar mass Mn of the liquid plasticizer is between 400 and 90,000 g/mol.

41. The process according to claim 35, wherein the liquid plasticizer is incorporated in the masterbatch during stage (a).

42. The process according to claim 35, wherein the liquid plasticizer is incorporated during stage (b).

43. The process according to claim 35, wherein the liquid plasticizer is incorporated during a stage (c) subsequent to stage (b), in the same mixer or a different mixer from that of stage (b).

44. The process according to claim 43, wherein stage (c) is carried out in a compounding screw extruder.

45. The process according to claim 43, wherein stage (c) is carried, out on an external mixer of the two-roll open mill type.

* * * * *